US008369360B2

(12) United States Patent
Davis

(10) Patent No.: US 8,369,360 B2
(45) Date of Patent: Feb. 5, 2013

(54) SYSTEM INFORMATION ACQUISITION IN MULTI-RADIO ACCESS TECHNOLOGY SYSTEM

(75) Inventor: Simon P. Davis, Romsey (GB)

(73) Assignee: Nokia Corporation, Espoo (FI)

( * ) Notice: Subject to any disclaimer, the term of this patent is extended or adjusted under 35 U.S.C. 154(b) by 924 days.

(21) Appl. No.: 12/387,374

(22) Filed: May 1, 2009

(65) Prior Publication Data
US 2009/0275325 A1 Nov. 5, 2009

Related U.S. Application Data

(60) Provisional application No. 61/126,619, filed on May 5, 2008.

(51) Int. Cl.
H04J 3/24 (2006.01)
(52) U.S. Cl. ........................................................ 370/473
(58) Field of Classification Search .......... 370/347–349, 370/392, 394, 400, 401, 473, 474, 476
See application file for complete search history.

(56) References Cited

U.S. PATENT DOCUMENTS

| 6,097,707 | A  | * | 8/2000 | Hodzic et al. | 370/321 |
| 6,795,435 | B1 | * | 9/2004 | Jouppi et al. | 370/394 |
| 7,489,647 | B2 | * | 2/2009 | Shin | 370/310 |
| 2002/0041589 | A1 | * | 4/2002 | Novak et al. | 370/352 |
| 2002/0044532 | A1 | * | 4/2002 | Geuder | 370/252 |
| 2003/0026223 | A1 | * | 2/2003 | Eriksson et al. | 370/335 |
| 2003/0096614 | A1 | | 5/2003 | Paila | 455/450 |
| 2007/0161401 | A1 | | 7/2007 | Sheynblat | 455/553.1 |

OTHER PUBLICATIONS

Transmission Control Protocol; Darpa Internet Program Protocol Specification; Sep. 1, 1981; XP015006775.
3GPP TS 36.300 V8.2.0 (Sep. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (109 pages).
3GPP TS 44.018 V8.2.0 (Mar. 2008) 3rd Generation Partnership Project; Technical Specification Group GSM/EDGE Radio Access Network; Mobile radio interface layer 3 specification; Radio Resource Control (RRC) protocol (Release 8) (399 pages).
3GPP TS 44.060 V8.0.0 (Mar. 2008) 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8) (545 pages).

* cited by examiner

Primary Examiner — Kerri Rose
(74) Attorney, Agent, or Firm — Harrington & Smith

(57) ABSTRACT

According to the exemplary embodiments of the invention, there is a method, apparatus and computer program for composing at least one system information message instance for a first particular radio access technology system, and for transmitting the at least one message instance to at least one network node. In addition, the exemplary embodiments of the invention provide for receiving, decoding, and processing the received at least one message instance. Further, according to the exemplary embodiments each one of the at least one message instance includes a start field to indicate whether the message instance is a first instance of the at least one message instance, and a stop field to indicate whether the message instance is a last instance of the at least one message instance.

24 Claims, 4 Drawing Sheets

| COMPOSING AT LEAST ONE SYSTEM INFORMATION MESSAGE INSTANCE FOR A FIRST PARTICULAR RADIO ACCESS TECHNOLOGY SYSTEM, WHERE EACH ONE OF THE AT LEAST ONE MESSAGE INSTANCE COMPRISES A START FIELD TO INDICATE WHETHER THE MESSAGE INSTANCE IS A FIRST INSTANCE OF THE AT LEAST ONE MESSAGE INSTANCE, AND A STOP FIELD TO INDICATE WHETHER THE MESSAGE INSTANCE IS A LAST INSTANCE OF THE AT LEAST ONE MESSAGE INSTANCE | — 6A |

↓

| TRANSMITTING THE AT LEAST ONE MESSAGE INSTANCE TO AT LEAST ONE MOBILE STATION | — 6B |

FIG.6

| RECEIVING AT LEAST ONE SYSTEM INFORMATION MESSAGE INSTANCE FOR A FIRST PARTICULAR RADIO ACCESS TECHNOLOGY SYSTEM, WHERE EACH ONE OF THE AT LEAST ONE MESSAGE INSTANCE COMPRISES A START FIELD TO INDICATE WHETHER THE MESSAGE INSTANCE IS A FIRST INSTANCE OF THE AT LEAST ONE MESSAGE INSTANCE, AND A STOP FIELD TO INDICATE WHETHER THE MESSAGE INSTANCE IS A LAST INSTANCE OF THE AT LEAST ONE MESSAGE INSTANCE | — 7A |

↓

| DECODING AND PROCESSING THE RECEIVED AT LEAST ONE MESSAGE INSTANCE | — 7B |

FIG.7

SYSTEM INFORMATION ACQUISITION IN MULTI-RADIO ACCESS TECHNOLOGY SYSTEM

CROSS-REFERENCE TO RELATED APPLICATIONS

This patent application claims priority under 35 U.S.C. §119(e) from Provisional Patent Application No.: 61/126,619, filed May 5, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to the acquisition of system-related information by a mobile device in a multi-radio access technology system.

BACKGROUND

This section is intended to provide a background or context to the embodiments of the invention that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that may appear in the specification and/or in the drawing figures are defined as follows:

| | |
|---|---|
| 3GPP | Third Generation Partnership Project |
| BSS | Base Station System |
| EDGE | Enhanced Data Rates for Global Evolution |
| GSM | Global System for Mobile communications |
| GERAN | GSM/EDGE Radio Access Network |
| MS | mobile station (may also referred to as a UE) |
| UMTS | universal mobile telecommunications system |
| UTRAN | UMTS Terrestrial Radio Access NetworkEUTRAN evolved UTRAN (LTE) |
| LTE | long term evolution |
| Node B | base station |
| BSS | base station subsystem |
| eNB | EUTRAN Node B (evolved Node B) |
| UE | user equipment (also referred to as a MS) |
| UL | uplink (UE towards eNB) |
| DL | downlink (eNB towards UE) |
| RLC | radio link control |
| RRC | radio resource control |
| RRM | radio resource management |
| MAC | medium access control |
| OFDMA | orthogonal frequency division multiple access |
| SC-FDMA | single carrier, frequency division multiple access |
| PLCID | physical layer cell identification |
| SACCH | slow associated control channel |
| Ncell | neighbor cell |
| NCL | neighbor cell list |
| PSI | packet system information |
| RAT | radio access technology |
| SI | System Information |

A communication system known as evolved UTRAN (EU-TRAN, also referred to as UTRAN-LTE or as E-UTRA) has been developed within 3GPP. A working assumption has been that the DL access technique will be OFDMA, and the UL access technique may be SC-FDMA.

One specification of interest in this regard is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

The discussion below is related generally to GSM Mobile communications and inter-workings between multiple Radio Access Technologies (RATs), also referred to as multi-RAT. Mobile stations that support multiple RATs typically receive System Information (SI) messages for each of the RATs supported by GERAN whilst the MS is present within GERAN.

It is noted that at the time of this invention GERAN supported only UTRAN as an alternative RAT, although efforts have been made to enable the support of E-UTRAN. The SI and PSI messages contain information to identify allowed neighbor cells in each of the supported RATs, and measurement parameters to be applied when measuring these neighbor cells. The MS uses this information to measure the quality of the signal received from each of the neighbor cells and to verify its identity via some form of cell identifier. Then, if the measurement results meet some pre-defined criteria, depending on the mechanisms supported in the GERAN cell, the MS may decide by itself, or be commanded to, reselect to the neighbor cell of a different RAT.

With the addition of further RATs, notably E-UTRAN, a problem occurs due to the fragmentation of MSs resulting from different MSs supporting different multi-RAT classes. For instance, some MSs may support GERAN only, other MSs may support GERAN and UTRAN or GERAN and E-UTRAN, while still other MSs may support GERAN, UTRAN and E-UTRAN.

As such, each BSS needs to broadcast information relating to neighbor cells and parameters relating to measuring neighbor cells in all other supported RATs. In addition this information may be sent to mobiles that already have a connection with the network in instances of dedicated signaling messages such as a PACKET MEASUREMENT ORDER or a MEASUREMENT INFORMATION message. However, it is noted that not all multi-RAT mobiles need to receive SI for all supported RATs. Further, according to relevant 3GPP standards, the MS must receive all instances, known as a consistent set or full set, of the (P)SI messages before it begins measurement reporting and possible cell reselection to one of the identified neighbor cells. This can be seen to at least result in an MS having to process information that is not required by the MS.

The exemplary embodiments of the invention at least address these problems, as described above, and other problems.

SUMMARY

In an exemplary aspect of the invention, there is a method comprising composing at least one system information message instance for a first particular radio access technology system, where each one of the at least one message instance comprises a start field to indicate whether the message instance is a first instance of the at least one message instance, and a stop field to indicate whether the message instance is a last instance of the at least one message instance, and transmitting the at least one message instance to at least one mobile station.

In another exemplary aspect of the invention, there is an apparatus comprising a processor configured to compose at least one system information message instance for a first particular radio access technology system, where each one of the at least one message instance comprises a start field to indicate whether the message instance is a first instance of the at least one message instance, and a stop field to indicate whether the message instance is a last instance of the at least one message instance, and a transmitter configured to transmit the at least one message instance to at least one mobile station.

In another exemplary aspect of the invention, there is a method comprising receiving at least one system information message instance for a first particular radio access technology system, where each one of the at least one message instance comprises a start field to indicate whether the message instance is a first instance of the at least one message instance, and a stop field to indicate whether the message instance is a last instance of the at least one message instance, and decoding and processing the received at least one message instance.

In still another exemplary aspect of the invention, there is an apparatus comprising a receiver configured to receive at least one system information message instance for a first particular radio access technology system, where each one of the at least one message instance comprises a start field to indicate whether the message instance is a first instance of the at least one message instance, and a stop field to indicate whether the message instance is a last instance of the at least one message instance, and a processor configured to decode and process the received at least one message.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 6 shows a logic flow diagram that illustrates the operation of a method, and a result of execution of computer program instructions, further in accordance with another of the exemplary embodiments of this invention; and FIG. 7 shows a logic flow diagram that illustrates the operation of a method, and a result of execution of computer program instructions, further in accordance with still another of the exemplary embodiments of this invention.

DETAILED DESCRIPTION

In regards to the problems as described above, it is noted that one might consider to avoid an MS having to read information that is not required by the MS, by splitting the information into different types of (Packet) System Information messages. Although, this may be effectively done for those MSs that do not support UTRAN, where they do not have to receive SI2quater or PSI3quater messages, this approach has limited flexibility and does little to improve system efficiency.

A standards document that is of interest herein is 3GPP TS 44.018 V8.2.0 (2008-03) Technical Specification 3rd Generation Partnership Project; Technical Specification Group GSM/EDGE Radio Access Network; Mobile radio interface layer 3 specification; Radio Resource Control (RRC) protocol (Release 8). In subclause 3.4.1.2.1 of this document, entitled "Parameters for Measurements and Reporting," it is indicated that parameters from the Measurement Information, SI2quater or PSI3quater messages allow a MS to build lists which are used for Measurement reporting, Enhanced Measurement reporting and for CCN mode settings.

Further in this regard, another standards document that is of interest herein is 3GPP TS 44.060 V8.0.0 (2008-03) Technical Specification 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8).

With the mechanisms defined in these 3GPP standards (e.g., 3GPP TS 44.018 and 3GPP TS 44.060) the MS must receive all instances of the (P)SI messages, known as a consistent set or full set, before it begins measurement reporting and possible cell reselection to one of the identified neighbor cells.

The exemplary embodiments of this invention overcome the foregoing and other problems, and provide further advantages, by combining the (P)SI information for non-GERAN RATS into existing (P)SI messages, while permitting a different definition of a consistent set of (P)SI information for a particular multi-RAT MS. The result is that, as one non-limiting example, a multi-RAT MS that supports only UTRAN can consider that it has received a consistent set of (P)SI messages (or PACKET MEASUREMENT ORDER or MEASUREMENT INFORMATION messages) when all instances of UTRAN Neighbor Cell information, plus any related UTRAN measurement parameters, have been received.

Figure 3:
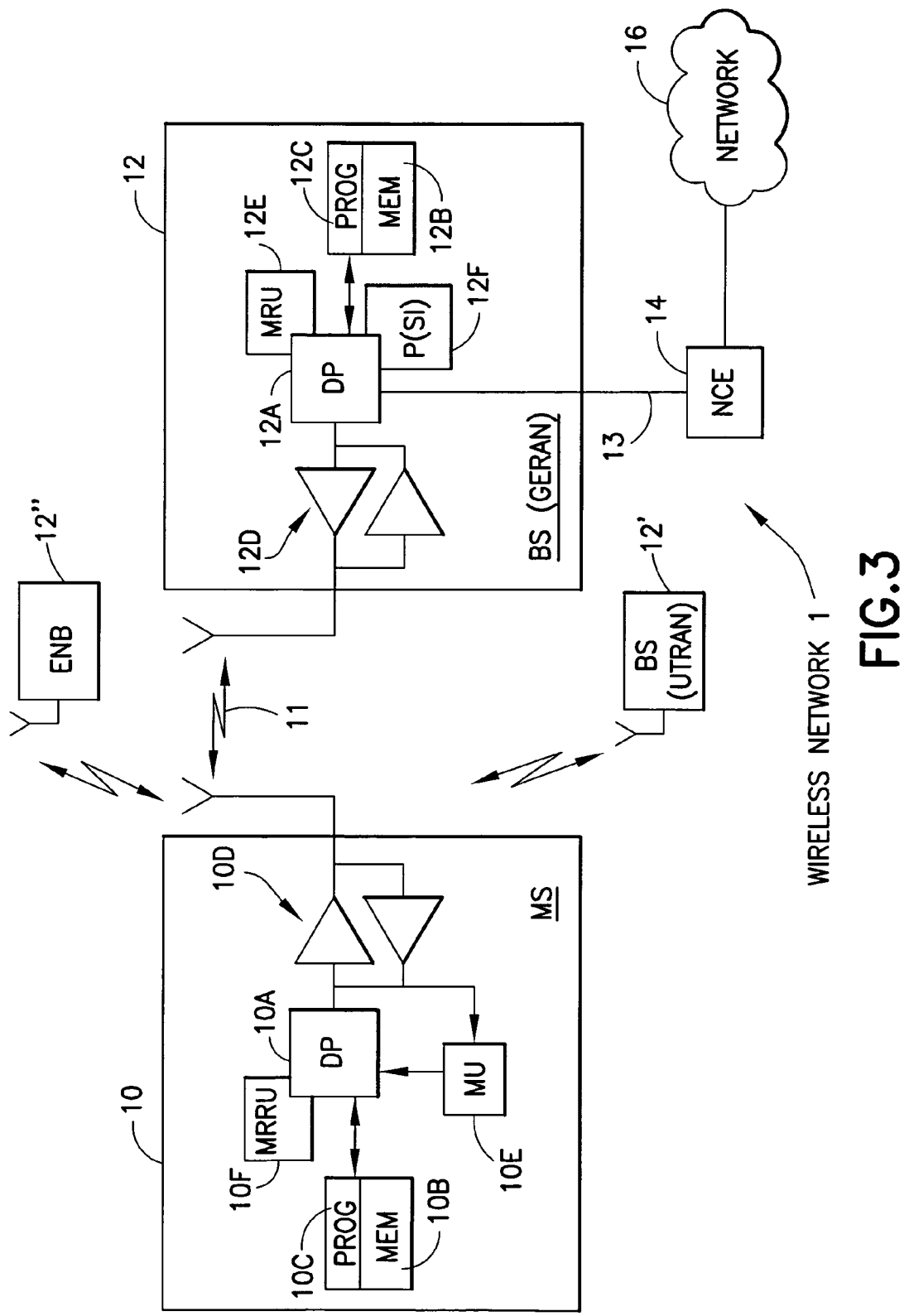
FIG. 3 shows a simplified block diagram of various electronic devices that are suitable for use in practicing the exemplary embodiments of this invention.

Before continuing with this description of the exemplary embodiments of this invention, reference is made to FIG. 3 for illustrating a simplified block diagram of various electronic devices that are suitable for use in practicing the exemplary embodiments of this invention. In FIG. 3 a wireless network 1 is adapted for communication with an apparatus, such as a mobile communication device which may be referred to without loss of generality as a MS 10 or as a UE 10, via a network access node, such as a BSS or a Node B (more simply a base station (BS 12)). The network 1 may include a network control element (NCE) 14 that provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications 11 with the BS 12 via one or more antennas. The BS 12 also includes a DP 12A, a MEM 12B that stores a PROG 12C, and a suitable RF transceiver 12D. The BS 12 is coupled via a data path 13 to the NCE 14. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the BS 12, or by hardware, or by a combination of software and hardware.

For the purposes of describing the exemplary embodiments of this invention the UE 10 may be assumed to also include a measurement unit (MU) 10E and a measurement result reporting unit (MRRU) 10F, and the BS 12 includes a measurement result unit (MRU) 12E configured to receive measurement results from the MRRU 10F of the UE 10. The MRU 12E may use the reported measurement results when making handover (HO) and other mobility decisions for the UE 10. There will typically be a plurality of neighbor BSs 12 having cells that can be measured by the UE 10, and some of these may be UTRAN BSs 12' and E-UTRAN eNBs 12". Note that the BS 12 in FIG. 3 maybe considered to be a GERAN-compatible BS, and that the UE 10 maybe capable of making both GERAN and E-UTRAN (and possibly also UTRAN) cell measurements.

The BS 12 is also assumed to include a unit 12F that composes P(SI) messages (or PACKET MEASUREMENT ORDER or MEASUREMENT INFORMATION messages) for the MS 10, where these messages, such as P(SI) messages, are composed in accordance with the exemplary embodiments of this invention. In accordance with the exemplary embodiments of the invention any network node including the MU 10E of the MS 10 is assumed to be capable of interpreting and reacting to received P(SI) messages from the BS 12.

In general, the various embodiments of the MS 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multicore processor architecture, as non-limiting examples.

Figure 1:
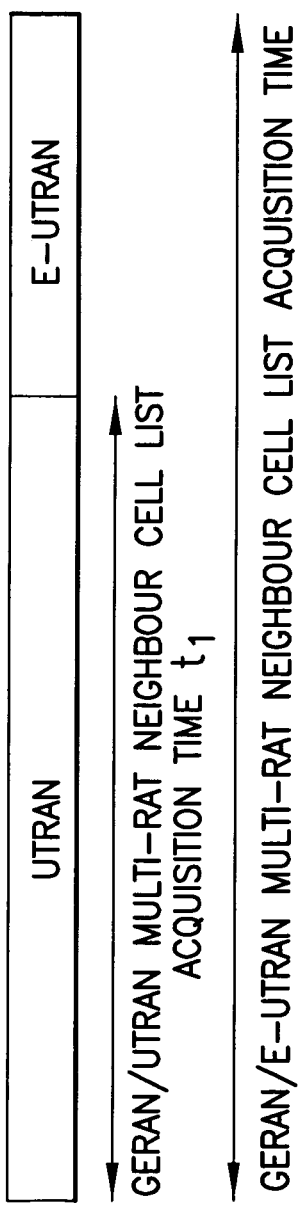
FIG. 1 shows the principle that a multi-RAT mobile that does not support all RATs supported by a GERAN cell can acquire the relevant System information more rapidly if the information is grouped in a particular manner.

Reference is now made to FIG. 1, where it is shown that an exemplary GERAN/UTRAN multi-RAT MS 10 can reduce its acquisition time for (P)SI messages containing Neighbor Cell (Ncell) information. In practice, the faster acquisition time may be dependent on when in the broadcast cycle the MS 19 begins to read the information. However, there may be considerable benefit for some MSs when there is a large amount of (P)SI information that is not relevant, and they begin to read the broadcast information at an appropriate moment in time.

It is also possible that the neighbor cell and measurement parameter information related to one RAT may be repeated within the System Information, thus reducing the maximum time to receive this information and begin cell reselection or measurement reporting.

FIG. 1 illustrates a more rapid Ncell List (NCL) acquisition time for the MS 10 supporting, for example, GERAN (BS 12) and UTRAN (BS 12'), given by $t_1$, as opposed to a MS 10 supporting GERAN (BS 12) and E-UTRAN (BS 12"), given by $t_2$.

Note that these exemplary embodiments of the invention apply as well for a MS 10 that supports E-UTRAN (the eNB 12") as well as GERAN and, in fact may have greater benefits if the E-UTRAN NCL is small (e.g., a small black list).

Further in this regard, in the case of LTE interworking a preference has been indicated for a so-called "black list" that is based on the NCL. In this approach the LTE center frequency would be indicated (in practice, the PLCID and the center frequency would be the minimum amount of information needed to uniquely identify a cell). In certain special cases, such as country border areas, a list of individual cells may be given where "not allowed" cells are indicated. In such a case the MS needs to determine which cells appear at each indicated frequency, and sufficient cell identification then needs to be sent to the network along with the actual measurement results. The use of the black list implies that the center frequencies and possibly the physical layer cell identification of not allowed (disallowed) EUTRAN cells are given in the EUTRAN NCL. The list can be considered to be "black" because the MS does not know the identities of the allowed EUTRAN neighbor cells from the NCL. In contradistinction, the use of a "white list" would imply that the allowed EUTRAN cells were given in the EUTRAN Neighbor Cell list, that is, as a minimum the center frequency and physical layer cell ID for each cell.

In order to most fully exploit the benefits of the signaling scheme, as shown in FIG. 1, several preconditions may be needed to be met. The preconditions can include that, for example, all neighbor cell information for each RAT is broadcast in consecutive instances of the relevant (P)SI message type. Another precondition may include that an indication of the instance where the NCL and measurement information for each RAT begins is provided. Further, a precondition may include that there is an indication provided that this instance of the message contains information for a particular RAT. In addition, a precondition may include that an indication of the instance where the NCL and measurement information for each RAT ends is provided. Further, measurement parameters for each RAT may be provided within the set of instances of the (P)SI message containing the Ncell information for that RAT.

Note that according to the exemplary embodiments of the invention one instance of the message may contain the last set of information for a first RAT (e.g., RAT1) and the beginning of the information for a subsequent RAT (e.g., RAT2). In this case those MSs 10 that support either or both RATS (i.e., RAT1 and RAT2) should receive this message instance.

Note also that the foregoing procedures may be optional for the network 1 to support, but may be mandatory for the MS 10 to support.

Figure 2:
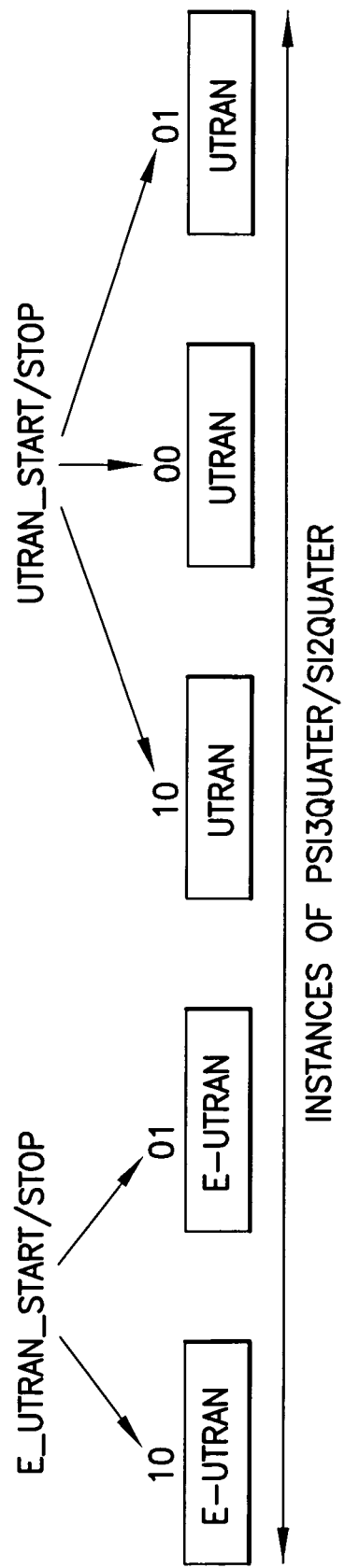
FIG. 2 illustrates a non-limiting example for labeling each message instance of relevant SI messages with a start and stop bit for each RAT.

FIG. 2 shows an exemplary embodiment of the labeling of Start/Stop bits for a multi-RAT SI, and depicts an exemplary five consecutive instances of PSI3quater/SI2quater messages (also PACKET MEASUREMENT ORDER or MEASUREMENT INFORMATION). In this example UTRAN and E-UTRAN Ncell and measurement information is combined in the existing SI2quater and PSI3quater messages. The E-UTRAN and UTRAN information is contained within consecutive instances of the respective messages as shown. It should be noted that one message instance may contain, for example, both UTRAN and E-UTRAN information.

In accordance with these exemplary and non-limiting embodiments of the invention each message instance may optionally have an extension, such as a bit field, referred to for convenience as a RAT_Start_Stop_Description which may be coded as shown in the exemplary pseudo-code below. According to the exemplary embodiments of the invention, if this optional RAT_Start_Stop_Description structure is present, it may contain either the start and stop fields for UTRAN, or the start and stop fields for E-UTRAN, or the start and stop fields for both UTRAN and E-UTRAN. Further, the RAT_Start_Stop_Description may be used for indicating the presence and boundaries of other types of RAT NC and measurement information. As such, it can be seen that these start and stop fields, as described herein, are not limited for use with only GERAN, UTRAN and/or E-UTRAN systems.

In a non-limiting embodiment of the invention start and stop fields maybe used to identify the message instances as at least described herein. Such as, if the message instance is a first instance containing UTRAN information, the UTRAN_Start field is set to 1. If the message is the last instance containing UTRAN information, the UTRAN_Stop field is set to 1. If the message is neither the first nor the last instance containing UTRAN information, the UTRAN_Stop and UTRAN_Start fields are present and set to 0. If there is no UTRAN information in the message instance, the UTRAN_Start and UTRAN_Stop fields are not present. It is noted that the same principles may be applied to the E_UTRAN_Start and E_UTRAN_Stop fields.

The following is an example of pseudo-code for implementing an exemplary embodiment of the invention as described above (note that the described bit field names, numbers of bits and bit organization and assignments are exemplary, and are not intended to be read in a limiting sense with regards to the exemplary embodiments of this invention):

```
{   null | 0 bit** = < no string>    --Receiver compatible with earlier
                                       release
    | 1                              --Additions in Release 8:
    { 0 | 1 < RAT_Start_Stop_Description :
    <RAT_Start_Stop_Description_struct > >
        < padding bits > } } } } //-- truncation at end of message allowed,
    bits '0' assumed
        ! < Distribution part error : bit (*) = < no string > > ;
```

With the RAT_Start Stop_Description_struct containing:

```
              0 | 1 { < UTRAN_Start : bit >
                     < UTRAN_Stop : bit > }
              0 | 1 { < E_UTRAN_Start : bit >
                     < E_UTRAN_Stop : bit > }
```

This particular and exemplary coding of the message instances allows the MS 10 to determine if this is a message instance that the MS 10 is required to receive, decode and process. In addition, if both Start and Stop bits are set to 1, the MS 10 knows that the current message instance is the only message instance required for that particular RAT. If the MS 10 has obtained all required information for RATs supported by the MS 10, then it does not need to read any additional message instances. That is, in accordance with these exemplary embodiments the MS 10 can consider that it has received a full set (consistent set) of the relevant System Information message. In this case power savings can be attained, since unneeded message instances do not need to be received.

If the MS 10 has received an instance of the (P)SI message with the Start bit set, an instance with the Stop bit set, and all intervening instances of the (P)SI message (if any), then it can consider that it has received all the necessary information for the RAT concerned.

The case of SI2quater is slightly different, as this message is also used to convey information regarding Enhanced Measurement reports which may be applicable to GERAN neighbor cells. In this case an additional exemplary embodiment of the invention add a bit to the SI2quater to indicate that the message instance contains GSM-related information, and that all GSM-related information is sent in consecutive instances starting from the first message instance.

In this approach, then, the first instance of SI2quater where GSM Parameters are not present indicates that all higher numbered instances do not contain GSM parameters. A <GSM_Parameters_Present: bit(1)> field may thus be added to the optional RAT_Start_Stop_Description structure in the SI2quater message structure.

Based on the foregoing it should be appreciated that the use of these exemplary embodiments provides a number of advantages for separating information into different (P)SI Message types.

First, there is no need to define a new message type or types, with additional indexing parameters, scheduling mechanism and rules for receiving. Second, the efficiency is enhanced in System Information message coding, as one message instance can share information between different RATs, rather than being padded with null information.

In addition, the use of these exemplary embodiments provides a number of advantages over simply merging the neighbor cell and measurement parameters into the same message in arbitrary order. For example, the time needed for a multi-RAT MS 10 (that does not support all possible RATs) to receive necessary information can be reduced. Further, there can be a reduction in the number of (P)SI message instances that the MS 10 needs to receive and decode.

Figure 4:
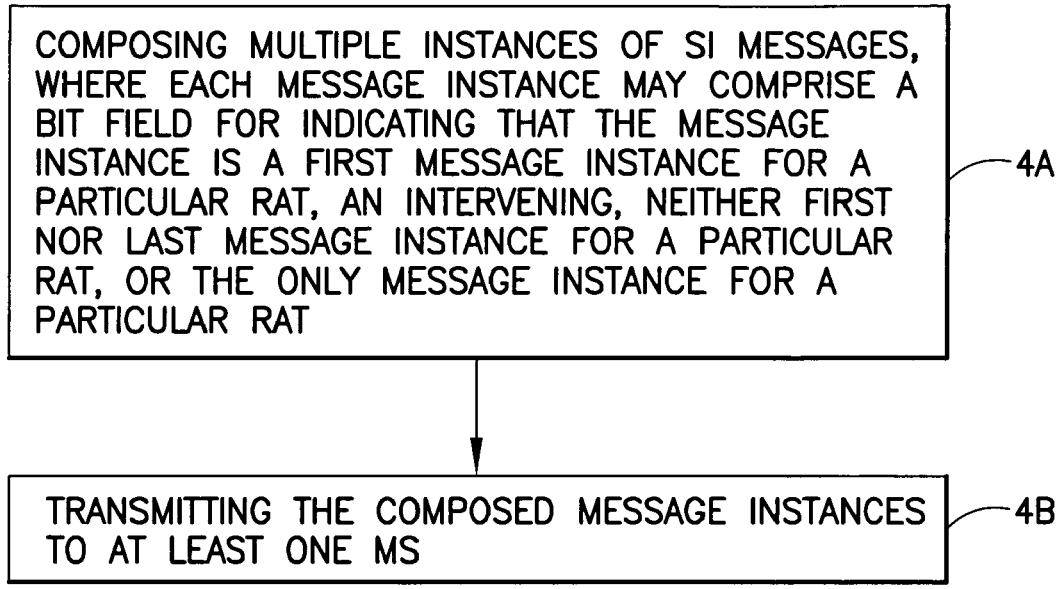
FIG. 4 shows a logic flow diagram that illustrates the operation of a method, and a result of execution of computer program instructions, in accordance with the exemplary embodiments of this invention.

Based on the foregoing it should be apparent that the exemplary embodiments of this invention provide a method, apparatus and computer program(s) to signal NCL and measurement information to a MS. In accordance with a method, and referring to FIG. 4, there is at Block 4A a step of composing multiple instances of SI messages, where each message instance may comprise a bit field for indicating that the message instance is a first message instance for a particular RAT, an intervening neither first nor last message instance for a particular RAT, a last message instance for a particular RAT, or the only message instance for a particular RAT. At Block 4B the composed message instances are transmitted to at least one MS.

The method, apparatus and computer program(s) of the preceding paragraph, where the bit field may indicate that it is a last message instance for a first particular RAT, and a first message instance for another, second particular RAT.

The method, apparatus and computer program(s) of the preceding paragraphs, where the bit field comprises, for each RAT, 2 bits coded as:

---

10 first message instance for the RAT;
00 intervening, neither first nor last first message instance for the RAT;
01 last message instance for the RAT; and
11 only message instance for the RAT.

---

The method, apparatus and computer program(s) of the preceding paragraphs, where a message instance comprises at least one of a SI2quater message, PSI3quater message, Measurement Information message, and Packet Measurement Order message.

The method, apparatus and computer program(s) of the preceding paragraphs, where a message instance may also include information for specifying that the message instance contains GSM-related information, and that all GSM-related information is sent in consecutive message instances starting from a first message instance.

The method, apparatus and computer program(s) of the preceding paragraph, where the message instance is a SI2quater message, and where a particular instance of the SI2quater message that does not contain GSM-related information indicates that subsequent consecutive instances also do not contain GSM-related information.

The method, apparatus and computer program(s) of the preceding paragraphs, where a first RAT is GERAN, and where a second RAT is UTRAN.

The method, apparatus and computer program(s) of the preceding paragraph, where a third RAT is E-UTRAN.

Figure 5:
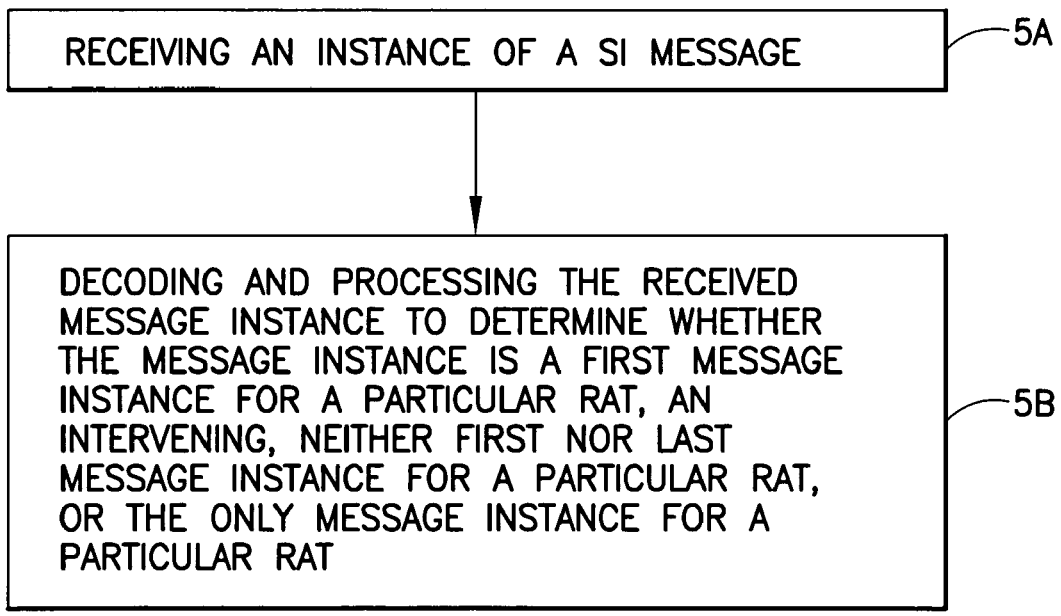
FIG. 5 shows a logic flow diagram that illustrates the operation of a method, and a result of execution of computer program instructions, further in accordance with the exemplary embodiments of this invention.

Based on the foregoing it should be apparent that the exemplary embodiments of this invention also provide a method, apparatus and computer program(s) to signal NCL and measurement information to a MS. In accordance with a method, and referring to FIG. 5, there is at Block 5A a step of receiving an instance of a SI message, and at Block 5B decoding and processing the received message instance to determine whether the message instance is a first message instance for a particular RAT, an intervening, neither first nor last message instance for a particular RAT, a last message instance for a particular RAT, or the only message instance for a particular RAT.

The method, apparatus and computer program(s) of the preceding paragraph, where decoding and processing the received message further determines whether the message is a last message instance for a first particular RAT, and a first message instance for another, second particular RAT.

The method, apparatus and computer program(s) of the preceding paragraphs, further comprising declaring that a full and consistent set of system information messages has been received, without receiving all instances of transmitted system information messages.

The method, apparatus and computer program(s) of the preceding paragraphs, where the message instance comprises a bit field, for each RAT, comprising 2 bits coded as:

10 first message instance for the RAT;
00 intervening, neither first nor last first message instance for the RAT;
01 last message instance for the RAT; and
11 only message instance for the RAT.

The method, apparatus and computer program(s) of the preceding paragraphs, where a message instance comprises one of a SI2quater, PSI3quater, Measurement Information and Packet Measurement Order.

The method, apparatus and computer program(s) of the preceding paragraphs, where a message instance may also include information for specifying that the message instance contains GSM-related information, and that all GSM-related information is sent in consecutive message instances starting from a first message instance.

The method, apparatus and computer program(s) of the preceding paragraph, where the message instance is a SI2quater message, and where a particular instance of the SI2quater message that does not contain GSM-related information indicates that subsequent consecutive instances also do not contain GSM-related information.

The method, apparatus and computer program(s) of the preceding paragraphs, where a first RAT is GERAN, and where a second RAT is UTRAN.

The method, apparatus and computer program(s) of the preceding paragraph, where a third RAT is E-UTRAN.

In addition, based on the foregoing it should be apparent that the exemplary embodiments of this invention also provide a method, apparatus and computer program(s) to compose at least one system information message. In accordance with a method, and referring to FIG. 6, there is at Block 6A a step of composing at least one system information message instance for a first particular radio access technology system, where each one of the at least one message instance comprises a start field to indicate whether the message instance is a first instance of the at least one message instance, and a stop field to indicate whether the message instance is a last instance of the at least one message instance, and at Block 6B transmitting the at least one message instance to at least one mobile station.

The method, apparatus, and computer program(s) of the preceding paragraph, where the at least one message instance is transmitted in a consecutive manner.

The method, apparatus, and computer program(s) of the preceding paragraphs, where the at least one message instance comprises at least one of a system information type 2 quater message, a packet system information type 3 quater message, and a measurement information message for the first particular radio access technology system.

The method, apparatus, and computer program(s) of the preceding paragraphs, where the first particular radio access technology system is one of a global system for mobile communications/enhanced data rates for global evolution radio access network, a universal mobile telecommunications system terrestrial radio access network, or an evolved universal mobile telecommunications system terrestrial radio access network radio access technology system.

The method, apparatus, and computer program(s) of the preceding paragraphs, further including composing at least one intervening, neither first nor last message instance for the first particular radio access technology system, and where the start field and the stop field of the at least one intervening message instance are coded to specify that the message instance is an intervening message instance.

The method, apparatus, and computer program(s) of the preceding paragraph, where the start field is a one bit field, and where a value 0 in the start field indicates that the one of the at least one message instance is not the first instance and a value 1 in the start field indicates that the one of the at least one message instance is the first instance of the at least one message instance, where the stop field is a one bit field, and where a value of 0 in the stop field indicates that the one of the at least one message instance is not the last instance and a value 1 in the stop field indicates that the one of the at least one message instance is the last instance of the at least one message instance, and where a value of 0 in the start field and a value of 0 in the stop field indicates that the one of the at least one message instance is an intervening message instance.

The method, apparatus, and computer program(s) of the preceding paragraph, where for a case where the start bit equals a value of 1 and the stop bit equals a value of 1 indicates that the one of the at least one message instance is an only message instance.

In addition, based on the foregoing it should be apparent that the exemplary embodiments of this invention also provide a method, apparatus and computer program(s) to receive at least one system information message. In accordance with a method, and referring to FIG. 7, there is at Block 7A a step of receiving at least one system information message instance for a first particular radio access technology system, where each one of the at least one message instance comprises a start field to indicate whether the message instance is a first instance of the at least one message instance, and a stop field to indicate whether the message instance is a last instance of the at least one message instance, and at Block 7B decoding and processing the received at least one message instance.

Further, it is noted that in accordance with a non-limiting exemplary embodiment of the invention either of the terms contiguous or consecutive as may be used herein are interchangeable.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the exemplary embodiments of the invention are not limited thereto. While various aspects of the exemplary embodiments of this invention may be illustrated and described as block diagrams, flow charts, or using some other pictorial representation, it is well understood that these blocks, apparatus, systems, techniques or methods described herein maybe implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN LTE), GERAN and UTRAN systems, it should be appreciated that the exemplary embodiments of this invention are not limited for use with only these particular types of wireless communication systems, and that they may be used to advantage with other types of wireless communication systems when it is desired to provide interworking with respect at least to reporting cell measurement results.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
composing at least one system information message instance for a first particular radio access technology system, where the at least one message instance comprises at least one of a system information type 2 quater message, a packet system information type 3 quater message, and a measurement information message for the first particular radio access technology system and where each one of the at least one message instance comprises
a start field to indicate whether the message instance is a first instance of the at least one message instance, and
a stop field to indicate whether the message instance is a last instance of the at least one message instance; and
transmitting the at least one message instance to at least one mobile station.

2. The method of claim 1, where the at least one message instance is transmitted in a consecutive manner.

3. The method of claim 1, where the first particular radio access technology system is one of a global system for mobile communications/enhanced data rates for global evolution radio access network, a universal mobile telecommunications system terrestrial radio access network, or an evolved universal mobile telecommunications system terrestrial radio access network radio access technology system.

4. The method as in claim 1 further comprising, composing at least one intervening, neither first nor last message instance for the first particular radio access technology system, and where the start field and the stop field of the at least one intervening message instance are coded to specify that the message instance is an intervening message instance.

5. The method of claim 4, where the start field is a one bit field, and where a value 0 in the start field indicates that the one of the at least one message instance is not the first instance and a value 1 in the start field indicates that the one of the at least one message instance is the first instance of the at least one message instance,
where the stop field is a one bit field, and where a value of 0 in the stop field indicates that the one of the at least one message instance is not the last instance and a value 1 in the stop field indicates that the one of the at least one message instance is the last instance of the at least one message instance, and
where a value of 0 in the start field and a value of 0 in the stop field indicates that the one of the at least one message instance is an intervening message instance.

6. The method as in claim 5, where for a case where the start bit equals a value of 1 and the stop bit equals a value of 1 indicates that the one of the at least one message instance is an only message instance.

7. A computer memory embodying instructions executed by a processor to perform the method of claim 1.

8. An apparatus comprising:
at least one processor; and
at least one memory including computer program code, where the at least one memory and the computer program code are configured, with the at least one processor, to cause the apparatus to at least:
compose at least one system information message instance for a first particular radio access technology system, where the at least one message instance comprises at least one of a system information type 2 quater message, a packet system information type 3 quater message, and a measurement information message for the first particular radio access technology system and where each one of the at least one message instance comprises
a start field to indicate whether the message instance is a first instance of the at least one message instance, and
a stop field to indicate whether the message instance is a last instance of the at least one message instance; and
transmit the at least one message instance to at least one mobile station.

9. The apparatus of claim 8, where the at least one memory including the computer program code is configured with the at least one processor to transmit the at least one message instance in a consecutive manner.

10. The apparatus of claim 8, where the first particular radio access technology system is one of a global system for mobile communications/enhanced data rates for global evolution radio access network, a universal mobile telecommunications system terrestrial radio access network, or an evolved universal mobile telecommunications system terrestrial radio access network radio access technology system.

11. The apparatus as in claim 8 further comprising, the at least one memory including the computer program code is configured with the at least one processor to cause the apparatus to compose at least one intervening message instance for the first particular radio access technology system, where the start field and the stop field of the at least one intervening message are coded to specify that the message instance is an intervening message instance.

12. The apparatus as in claim 11,
where the start field is a one bit field, and where a value 0 in the start field indicates that the message instance is not the first instance and a value 1 in the start field indicates that the one of the at least one message instance is the first instance of the at least one message instance,
where the stop field is a one bit field, and where a value of 0 in the stop field indicates that the message instance is not the last instance and a value 1 in the stop field indicates that the one of the at least one message instance is the last instance of the at least one message instance, and
where a value of 0 in the start field and a value of 0 in the stop field indicates that the one of the at least one message instance is an intervening message instance.

13. The apparatus as in claim 12, where for a case where the start bit equals a value of 1 and the stop bit equals a value of 1 indicates that the one of the at least one message instance is an only message instance.

14. A method comprising:
receiving at least one system information message instance for a first particular radio access technology system, where the at least one message instance comprises at least one of a system information type 2 quater message, a packet system information type 3 quater message, and a measurement information message for the first particular radio access technology system and where each one of the at least one message instance comprises
a start field to indicate whether the message instance is a first instance of the at least one message instance, and
a stop field to indicate whether the message instance is a last instance of the at least one message instance; and
decoding and processing the received at least one message instance.

15. The method of claim 14, where the at least one message instance is decoded and processed in a consecutive manner.

16. The method as in claim 14, where the first particular radio access technology system is one of a global system for mobile communications/enhanced data rates for global evolution radio access network, a universal mobile telecommunications system terrestrial radio access network, or an evolved universal mobile telecommunications system terrestrial radio access network radio access technology system.

17. The method as in claim 14,
where the start field is a one bit field, and where a value 0 in the start field indicates that the one of the at least one message instance is not the first instance and a value 1 in the start field indicates that the one of the at least one message instance is the first instance of the at least one message instance,
where the stop field is a one bit field, and where a value of 0 in the stop field indicates that the one of the at least one message instance is not the last instance and a value 1 in the stop field indicates that the one of the at least one message instance is the last instance of the at least one message instance, and
where a value of 0 in the start field and a value of 0 in the stop field indicates that the one of the at least one message instance is an intervening message instance.

18. The method as in claim 17, where for a case where the start bit equals a value of 1 and the stop bit equals a value of 1 indicates that the one of the at least one message instance is an only message instance.

19. A computer memory embodying instructions executed by a processor to perform the method of claim 14.

20. An apparatus comprising:
at least one processor; and
at least one memory including computer program code, where the at least one memory and the computer program code are configured, with the at least one processor, to cause the apparatus to at least:
receive a at least one system information message instance for a first particular radio access technology system, where the at least one message instance comprises at least one of a system information type 2 quater message, a packet system information type 3 quater message, and a measurement information message for the first particular radio access technology system and where each one of the at least one message instance comprises
a start field to indicate whether the message instance is a first instance of the at least one message instance, and
a stop field to indicate whether the message instance is a last instance of the at least one message instance; and
decode and process the received at least one message instance.

21. The apparatus of claim 20, where the at least one memory including the computer program code is configured with the at least one processor to cause the apparatus to decode and process the at least one message instance in a consecutive manner.

22. The apparatus as in claim 20, where the first particular radio access technology system is one of a global system for mobile communications/enhanced data rates for global evolution radio access network, a universal mobile telecommunications system terrestrial radio access network, or an evolved universal mobile telecommunications system terrestrial radio access network radio access technology system.

23. The apparatus as in claim 20,
where the start field is a one bit field, and where a value 0 in the start field indicates that the one of the at least one message instance is not the first instance and a value 1 in the start field indicates that the one of the at least one message instance is the first instance of the at least one message instance,
where the stop field is a one bit field, and where a value of 0 in the stop field indicates that the one of the at least one message instance is not the last instance and a value 1 in the stop field indicates that the one of the at least one message instance is the last instance of the at least one message instance, and
where a value of 0 in the start field and a value of 0 in the stop field indicates that the one of the at least one message instance is an intervening message instance.

24. The apparatus as in claim 23, where for a case where the start bit equals a value of 1 and the stop bit equals a value of 1 indicates that the one of the at least one message instance is an only message instance.

* * * * *

UNITED STATES PATENT AND TRADEMARK OFFICE
CERTIFICATE OF CORRECTION

PATENT NO. : 8,369,360 B2  
APPLICATION NO. : 12/387374  
DATED : February 5, 2013  
INVENTOR(S) : Simon P. Davis Page 1 of 1

It is certified that error appears in the above-identified patent and that said Letters Patent is hereby corrected as shown below:

In the Claims:

In Claim 20:
Column 14, line 49, "a" should be deleted.

Signed and Sealed this
Thirtieth Day of April, 2013

Teresa Stanek Rea
*Acting Director of the United States Patent and Trademark Office*